United States Patent [19]

Regelsberger

[11] Patent Number: 4,967,184

[45] Date of Patent: Oct. 30, 1990

[54] COMPUTER DISK WITH SECURITY PROTECTION

[75] Inventor: Matthias H. Regelsberger, Rochester, N.Y.

[73] Assignee: Eastman Kodak Company, Rochester, N.Y.

[21] Appl. No.: 409,496

[22] Filed: Sep. 19, 1989

[51] Int. Cl.⁵ .......................... G08B 13/14; G11B 5/82
[52] U.S. Cl. ..................................... 340/572; 340/551; 360/135
[58] Field of Search ................ 340/572, 551; 360/135, 360/133, 60

[56] References Cited

U.S. PATENT DOCUMENTS

| | | | |
|---|---|---|---|
| 3,665,449 | 5/1972 | Elder et al. | 340/572 |
| 3,747,086 | 7/1973 | Peterson | 340/572 |
| 3,820,104 | 6/1974 | Fearon | 340/572 |
| 4,074,249 | 2/1978 | Minasy | 340/572 |
| 4,553,136 | 11/1985 | Anderson et al. | 340/572 |
| 4,665,387 | 5/1987 | Cooper et al. | 340/572 |
| 4,710,752 | 12/1987 | Cordery | 340/572 |
| 4,910,625 | 3/1990 | Albrecht et al. | 360/135 |

Primary Examiner—Joseph A. Orsino
Assistant Examiner—Thomas J. Mullen, Jr.
Attorney, Agent, or Firm—Warren W. Kurz

[57] ABSTRACT

A computer disk of the type having a central drive hub comprised at least in part of ferromagnetic metal to clamp the disk to a magnet spindle drive is provided with a ring-shaped amorphous ferromagnetic surveillance marker between the hub flange and the disk substrate. The hub metal has a high permeability, e.g. $\geq 2,000$ to concentrate the drive magnet field in the hub, when the disk is in the disk drive, thereby to eliminate fringe fields that would magnetize the marker. This is to allow the use of a low magnetic field intensity sensor in the sensor to detect the presence of the marker to enable recording of data on the disk. The hub metal also has a coercivity between the coercivity of the marker and the intensity of the magnetic field employed in the interrogation zone of an area surveillance portal to eliminate the effect of any residual magnetism on the hub metal caused by the drive magnet thereby to enhance the detectability of the marker by the portal.

12 Claims, 1 Drawing Sheet

COMPUTER DISK WITH SECURITY PROTECTION

FIELD OF THE INVENTION

This invention relates to the field of article surveillance protection of data recorded on computer data disks.

BACKGROUND OF THE INVENTION

Article surveillance systems that work on the principle of detecting the presence of a particular form of ferromagnetic material in a periodically changing low level magnetic field are well known. U.S. Pat. No. 4,553,136 illustrates a representative system of this type in which an article to be protected against unauthorized removal from a defined area, such as a store or library, has a marker attached to it that has in it a strip of low coercivity ferromagnetic material of high permeability. When the article, with the marker attached, is brought into an interrogation zone in which the low level periodically changing magnetic field is applied via a radiating antenna located at the edge of the zone, the presence of the strip modifies the pattern of the applied field, generating magnetic sub-fields at harmonics of the fundamental frequency of the applied field. These harmonic fields are picked up by a receiving antenna also located at the edge of the interrogation zone and fed to a receiver where they are detected and used to trigger an alarm to signal the unauthorized removal of the article. Other representative examples of ferromagnetic marker systems of this general type are found in U.S. Pat. Nos. 3,665,449; 3,747,086; 3,820,104 and 4,710,752.

There is a recognized need for surveillance systems to provide corresponding security protection for computer disk magnetic media. With the proliferation in business and government of personal computers and the ready portability and easy concealability of the miniature data disks used by these computers it is important to provide article surveillance sensor systems for computer data storage disks that ensure that sensitive data is not lost or compromised intentionally or unintentionally by unauthorized removal from secure areas in which the data is normally used. While non-magnetic marker systems are available for surveillance purposes and would have the advantage of not interfering with the magnetic media of data disks, they are generally not physically suited to the miniature size and slim geometries of conventional 5.25" and 3.5" data disks, of the magnetic, magneto-optical and optical types, that are widely used in personal computers.

One proposal for a surveillance system for personal computer data disks involves the attachment of a low coercivity, high magnetic permeability ferromagnetic marker strip to an inside surface of the jacket in which the disk is housed. This, however, would allow the system to be easily defeated by removing the disk from the jacket and reinserting it into another, non-protected jacket with the data on the disk still intact.

An improved form of surveillance protection for computer data disks is disclosed in copending application Ser. No. 255,882 now U.S. Pat. No. 4,910,625 assigned to the assignee of the present application. As described in this copending application, a band of preferably amorphous ferromagnetic marker material is integrally formed directly on the data disk about the central aperture of the disk and concentric therewith. This has the advantage that the disk itself bears the surveillance marker thus eliminating the ability to defeat the protection by removing the disk from the jacket.

A particular advantage of disks bearing ferromagnetic markers in this manner is that computers used in security areas may be provided with sensors in the disk drive to detect the presence of the marker on a disk loaded into the drive in a manner comparable to that described above. If a security disk with the marker is detected by the sensor, a write enable flag is set in the computer to allow data to be transferred from memory and recorded on the disk. In the absence of a detected marker, the write enable flag is not set and recording of data onto the disk is inhibited thus preventing the unauthorized transfer of security data onto unsecured disks. Such an arrangement is also described in the aforementioned copending application.

In the case of some disk drive systems, as used, for example, with 3.5" microfloppy disks, the disk is provided with a central drive hub, usually comprised entirely of a ferromagnetic metal, which is adapted to be attracted by a magnet on the disk drive spindle to aid in clamping the disk to the drive spindle. Typically, the spindle magnet has a field strength of 50-150 Gauss. The magnetic media on which the data is recorded on the disk is not adversely affected by this field, first because the magnet field is largely concentrated in the vicinity of the metal hub and secondly because the magnetic medium on the disk has a coercivity that is somewhat higher than any residual fringing fields between the magnet and the hub that might extend into the data region on the disk. On the other hand, a surveillance marker of the type described in the aforementioned application, preferably being of a low coercivity amorphous ferromagnetic material, and being located at the periphery of the disk central aperture adjacent the drive spindle, can have its magnetic state controlled or fixed by the fringe field between the spindle magnet and the hub thus preventing the relatively low intensity interrogating field of the drive sensor from detecting the presence of the marker. It is therefore desirable to provide an arrangement that ensures that the marker on a metal hubbed disk can be detected by the sensor in the presence of a magnetic disk clamp on the drive spindle.

Moreover, the metal drive hub in a conventional 3.5" microfloppy disk, which is made of ferromagnetic steel, can be magnetized by the field of the drive spindle magnet with a certain amount of the magnetism being retained in the hub when the disk is removed from the drive. As in the case of the disk drive, the fringe field from the magnetized hub can act to fix the magnetization of the marker on the disk and thereby disable the marker in the presence of a relatively low intensity magnetic field as is normally used in an area surveillance portal detector.

It is therefore an object of the present invention to provide a metal hubbed computer data disk with a magnetic surveillance marker that allows detection of the marker in the presence of a low intensity magnetic interrogation field.

It is another object of the invention to provide a metal hubbed computer data disk with a magnetic marker that allows the detection of the magnetic marker when the disk is positioned on the drive spindle of a disk drive using a magnetic clamping spindle.

It is a further object of the invention to provide a metal hubbed computer data disk with a magnetic surveillance marker that is capable of being detected in a low intensity magnetic interrogation field of a surveillance portal detector.

SUMMARY OF THE INVENTION

These and other objects of the invention are accomplished by the provision of an improved security computer data disk of the type having a central aperture, a drive hub located in the aperture, the hub having a circumferential flange overlying the perimeter of the substrate aperture and at least a portion of the hub comprised of a ferromagnetic metal adapted to cooperate with a magnetic disk clamp in a disk drive apparatus, means for securing the disk substrate to the hub flange and a ring-shaped surveillance marker formed around at least a substantial portion of the aperture periphery between the disk substrate and the hub flange. In accordance with the improvement of the invention the ferromagnetic hub metal is selected to have a coercivity that is greater than the coercivity of the surveillance marker and less than the field intensity of the magnetic field employed in the detection zone of an area surveillance portal so as to allow detection of the presence of the surveillance marker as the disk is carried through the portal. Further, the ferromagnetic hub metal is selected to have a permeability that is relatively high, e.g. $\mu \geqq$ about 2000, to concentrate substantially all of the disk clamp magnet field in the hub metal and thus prevent the creation of fringe fields that would mask the surveillance marker when the disk is in place in the drive.

DETAILED DESCRIPTION

Figure 1:
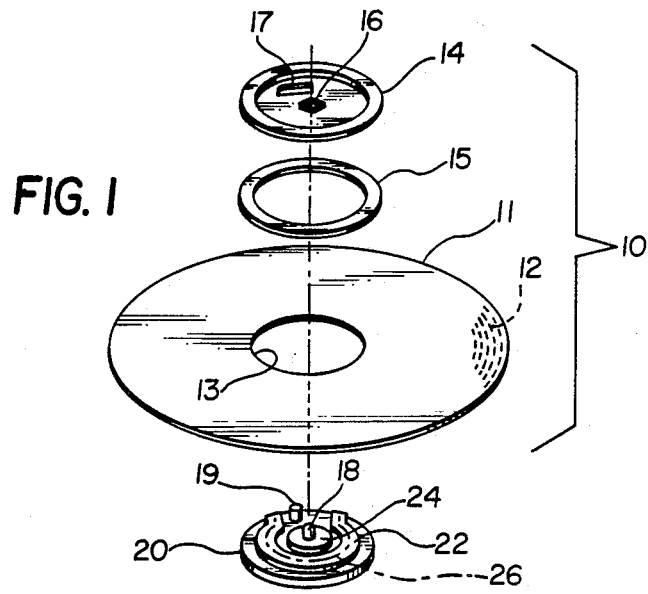
FIG. 1 is a perspective exploded view of a 3.5" microfloppy computer disk and disk drive.

In FIG. 1 there is shown a 3.5" microfloppy magnetic computer data disk 10 which comprises a circular disk substrate 11 of thin high polymer material on which a coating of magnetic recording material is formed on one or both surfaces for recording and reading of data on concentric tracks 12 by a recording/reproducing magnetic head (not shown). A circular central aperture 13 formed in the center of the disk is adapted for reception of a generally cup-shaped central drive hub 14 comprised of a ferromagnetic metal, such as iron or steel. In a conventional disk, hub 14 is secured to disk substrate 11 by a double faced adhesive ring 15 fitted between the outer flange of hub 14 and the surface of substrate 11. In the security disk of the present invention, ring 15 preferably comprises a ring-shaped strip of amorphous ferromagnetic material which may be coated or laminated with a suitable adhesive on both faces to serve simultaneously as an adhesive ring to bond hub 14 to disk substrate 11 and as a surveillance marker. Accordingly, the ferromagnetic material of ring 15 is preferably selected to have a low coercivity and a high magnetic permeability to serve as a surveillance marker in accordance with the teachings of copending application Ser. No. 255,882 assigned to the assignee of the present invention. Such a material is available under the trademark Metglas from Allied-Signal Corporation of Morris Township, Morris County, N.J.

Hub 14 is provided with a central opening 16 and a drive opening 17 adapted to be engaged in conventional manner with a central spindle 18 and a drive pin 19 on drive spindle 20 which is part of the disk drive system. Additionally, drive spindle 20 is conventionally provided with one or more permanent magnets, such as U-shaped permanent magnet 22, acting to attract and hold the bottom surface of hub 14 against a bearing surface 24 thereby to aid in the clamping the disk 10 to the drive spindle during disk loading and read/write operations. The magnetization of spindle magnet 22 is such that the north/south poles lie on opposite sides of the magnet center line represented by dot-dash line 26.

Figure 2:
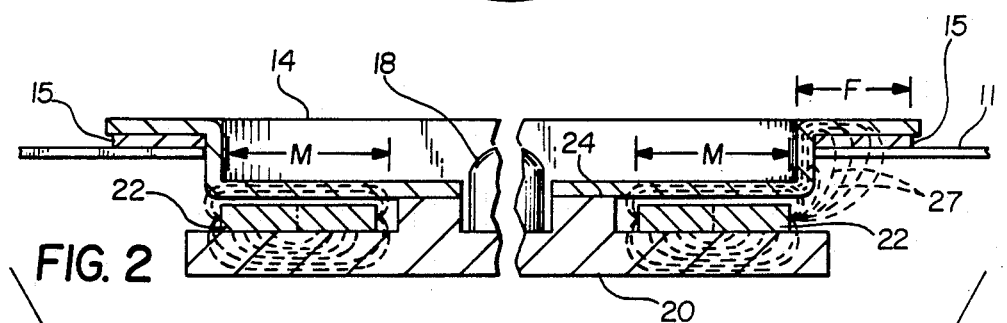
FIG. 2 is a cross section of a segment of a microfloppy disk embodying the present invention.

Referring to FIG. 2, the external magnetic fields created by magnet 22 are seen to be largely concentrated in the main field region M between between the magnetic poles and passing through the ferromagnetic steel of hub 14. In addition, as illustrated on the right hand side of FIG. 2, external fringe fields 27 exist in region F when conventional low permeability ferromagnetic steel is used for hub 14. These fringe fields pass through the marker 15 and are of sufficient strength to control or fix the magnetization of the marker. If a low strength interrogating sensor field is created near the disk hub to detect the presence of marker 15 for security purposes, the overriding effect of fringe field 27 can disable marker 15 by fixing its magnetization and thus rendering it ineffective to generate harmonic frequencies in the magnetic sensor field.

The reason this fringe field can exist in sufficient strength in the region F of the marker is that the ferromagnetic steel conventionally used for microfloppy hubs has a relatively low permeability. For example, a commercial microfloppy disk sold by Verbatim Corporation of Charlotte, N.C., utilizes a 430 stainless steel core which has a maximum permeability of 1600 Gauss per Oersted. The ability of a metal with this relatively low permeability to fully concentrate the spindle magnetic field in the hub metal and prevent adverse fringe fields is limited. Accordingly, in accordance with one aspect of the invention, the hub metal chosen for use as the hub of a security disk with a surveillance marker bonded to the central disk aperture is selected to have a substantially higher permeability, at least equal to or greater than about 2,000 Gauss per Oersted and more preferably equal to or greater than 100,000 Gauss per Oersted. With such a high permeability, substantially all of the magnetic flux from spindle magnet 22 is concentrated in the hub metal in the region M is seen on the left hand side of FIG. 2. Referring to the B-H magnetization graph of FIG. 4, by using the high permeability hub metal in accordance with the invention, the fringe field $f_{27}$ can be brought from a relatively high value down to a value $f'_{27}$ that is well below the coercivity $c_m$ of the marker 15 thus freeing the marker to operate as a nonlinear element to produce harmonic frequencies in an interrogating sensor field within the disk drive apparatus.

Figure 4:
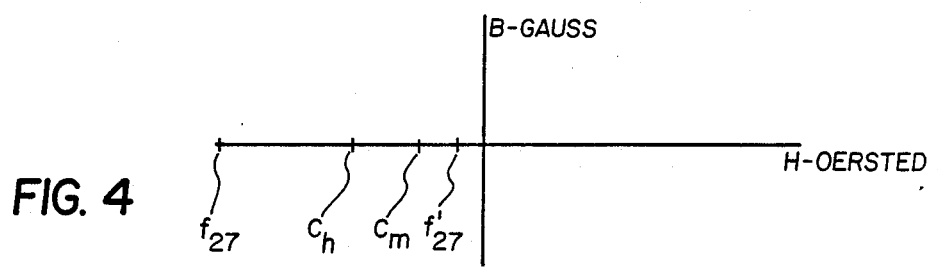
FIG. 4 is the graph of a B-H curve useful in explaining the invention.

A further problem with the use of conventional ferromagnetic steel for the hub metal lies in the fact that the drive spindle magnet magnetizes the hub in the drive and this magnetization is retained when the disk is removed from the drive. The coercivity of the hub is typically of the same order as the intensity, e.g. 3-5 Gauss, of the interrogating magnetic field of a sensor portal used in area surveillance systems. Consequently, the magnetization of the marker is fixed by the hub magnetization and the sensor field is unable to detect the presence of the marker as the disk is carried through the interrogating magnetic field in the portal. In accordance with a further aspect of the invention, therefore, the hub metal chosen for use in the security disk of the invention is selected to have a coercivity which is lower than the interrogating AC magnetic field and preferably is less than half the rms value of the AC magnetic field. This selection of coercivity ensures erasure by the interrogating field of any residual magnetization on the hub and, thus, enhances the response of the marker to the interrogating field. Preferably, the selected hub coercivity $c_h$ is greater than the coercivity $c_m$ of the marker 15, as seen in FIG. 4, so as to avoid interference between the hub and marker in the interrogating magnetic field. A metal having the characteristics of permalloy would be suitable for use as the hub metal in a security disk of the invention.

Figure 3:
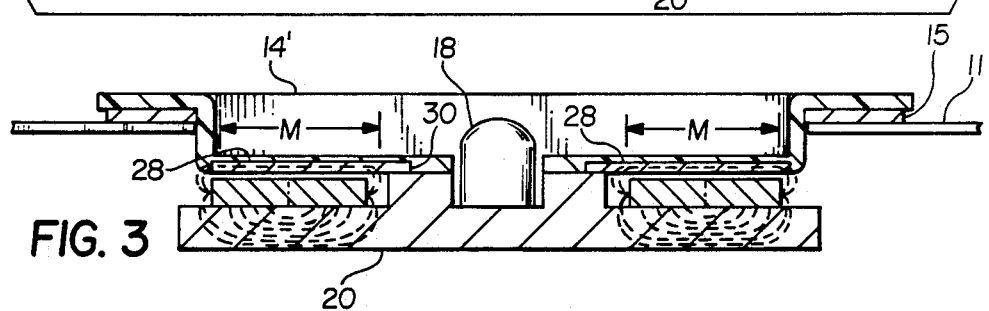
FIG. 3 is a cross section of a segment of a microfloppy disk illustrating an alternative embodiment of the present invention.

Referring to FIG. 3, a modified disk hub structure is illustrated which combines the features just described with the advantage of lower cost of production as compared to a hub made entirely of metal with the chosen permeability and coercivity characteristics. Thus the hub 14' is comprised of a plastic material which may be a thermoplastic material using a molding or extrusion process to achieve the desired configuration. A metal plate 28 is formed on the bottom of the hub with the metal being selected to have the desired permeability and coercivity characteristics as described above. Preferably, plate 28 is pancake shaped with a central cutout to allow passage of spindle 18 through the bottom of the hub 14'. As in the case of the all metal hub, the plate 28 may be permalloy or any of the various high permeability, low coercivity metals meeting the described characteristics. Plate 28 may be applied to hub 14' with an adhesive or ultrasonic bonding or it may be Positioned in an injection mold and become adhered to or embedded in the hub plastic during the molding process.

Thus there has been described an improved computer security disk of the type employing a central drive hub comprised at least in part of ferromagnetic metal for cooperation with a magnet disk drive clamp that provides enhanced detectability in the disk drive and also when carried through an interrogating portal. The invention has been described in detail with particular reference to presently preferred embodiments, but it will be understood that variations and modifications can be effected within the spirit and scope of the invention. For example, the all metal or partial metal hub described may be substituted with a hub of molded plastic resin material in which metal particles with the described magnetic characteristics are dispersed more or less uniformly prior to the the hub molding operation.

What is claimed is:

1. An improvement in security protection of computer disks of the type having a central aperture, a drive hub located in the aperture, the hub having a circumferential flange overlying the perimeter of the substrate aperture and at least a portion of the hub comprised of a ferromagnetic metal adapted to cooperate with a magnetic disk clamp in a disk drive apparatus, means for securing the disk substrate to the hub flange and a ring-shaped surveillance marker formed around at least a substantial portion of the aperture periphery between the disk substrate and the hub flange, the improvement comprising:

said ferromagnetic hub metal having a coercivity greater than the coercivity of the surveillance marker and less than the field intensity of the magnetic field employed in the detection zone of a surveillance portal to detect the presence of the surveillance marker as the disk is carried through the portal.

2. An improvement in security protection of computer disks of the type having a central aperture, a drive hub located in the aperture, the hub having a circumferential flange overlying the perimeter of the substrate aperture and at least a portion of the hub comprised of a ferromagnetic metal adapted to cooperate with a magnetic disk clamp in a disk drive apparatus, means for securing the disk substrate to the hub flange and a ring-shaped surveillance marker formed around at least a substantial portion of the aperture periphery between the disk substrate and the hub flange, the improvement comprising:

said ferromagnetic hub metal having a permeability greater than or equal to a value of about 2,000 to substantially prevent the creation of fringe fields by the magnetic disk clamp that would mask the surveillance marker when the disk is in place in the drive.

3. An improvement in security protection of computer disks of the type having a central aperture, a drive hub located in the aperture, the hub having a circumferential flange overlying the perimeter of the substrate aperture and at least a portion of the hub comprised of a ferromagnetic metal adapted to cooperate with a magnetic disk clamp in a disk drive apparatus, means for securing the disk substrate to the hub flange and a ring-shaped surveillance marker formed around at least a substantial portion of the aperture periphery between the disk substrate and the hub flange, the improvement comprising:

said ferromagnetic hub metal having a permeability greater than or equal to a value of about 2,000 to substantially prevent the creation of fringe fields by the magnetic disk clamp that would mask the surveillance marker when the disk is in place in the drive and said hub metal also having a coercivity greater than the coercivity of the surveillance marker and less than the field intensity of the magnetic field employed in the detection zone of a surveillance portal to detect the presence of the surveillance marker as the disk is carried through the portal.

4. The improvement of claims 2 or 3 in which the permeability of the hub metal is greater than or equal to about 100,000.

5. The improvement of claims 1, 2 or 3 in which the hub is made entirely of ferromagnetic metal as defined.

6. The improvement of claims 1; 2 or 3 in which the hub is comprised of a non-ferromagnetic material and includes a pancake shape plate of ferromagnetic metal, as defined, in the central portion of the hub.

7. The improvement of claims 1, 2 or 3 in which the hub is comprised of a molded plastic resin material with ferromagnetic metal particles, as defined, dispersed therein.

8. A security computer disk comprising:
a disk substrate having a central aperture therein;
data recording media disposed circumferentially on at least one side of said substrate;
a drive hub positioned in the aperture, the hub having a circumferential flange overlying the perimeter of the substrate aperture, at least a portion of the hub being comprised of a ferromagnetic metal adapted to cooperate with a magnetic disk clamp in a disk drive apparatus;

means for securing the hub flange to the disk substrate;

and a ring-shaped surveillance marker formed around at least a substantial portion of the aperture periphery between the disk substrate and the hub flange;

said ferromagnetic hub metal having a permeability greater than or equal to a value of about 2,000 to substantially prevent the creation of fringe fields by the magnetic disk clamp that would mask the surveillance marker when the disk is in place in the drive, said hub metal also having a coercivity greater than the coercivity of the surveillance marker and less than the field intensity of the magnetic field employed in the detection zone of a surveillance portal to detect the presence of the surveillance marker as the disk is carried through the portal.

9. The security computer disk of claim 8 in which said hub metal permeability is greater than or equal to about 100,000.

10. The security computer disk of claim 8 in which the hub is made entirely of ferromagnetic metal as defined.

11. The security computer disk of claim 8 in which the hub is comprised of a non-ferromagnetic material and includes a plate of ferromagnetic metal, as defined, in the central portion of the hub.

12. The security computer disk of claim 8 in which the hub is comprised of a molded plastic resin material with ferromagnetic metal particles, as defined, dispersed therein.

* * * * *